United States Patent
Itou et al.

(10) Patent No.: US 9,166,910 B2
(45) Date of Patent: Oct. 20, 2015

(54) DATA RELAY APPARATUS

(71) Applicant: DENSO CORPORATION, Kariya, Aichi-pref. (JP)

(72) Inventors: Akito Itou, Kariya (JP); Michio Nakamura, Toyoake (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 14/106,917

(22) Filed: Dec. 16, 2013

(65) Prior Publication Data

US 2014/0241370 A1    Aug. 28, 2014

(30) Foreign Application Priority Data

Feb. 26, 2013  (JP) .................. 2013-36049

(51) Int. Cl.
*H04L 12/721*  (2013.01)
*H04L 12/715*  (2013.01)

(52) U.S. Cl.
CPC ............... *H04L 45/44* (2013.01); *H04L 45/04* (2013.01)

(58) Field of Classification Search
CPC ............. H04L 12/66; H04L 12/40006; H04L 12/4625; H04L 2012/40215; H04L 45/04; Y02B 60/34; Y02B 60/43
See application file for complete search history.

(56) References Cited

U.S. PATENT DOCUMENTS

| 2002/0006139 A1* | 1/2002 | Kikkawa et al. ............... 370/502 |
| 2010/0131816 A1* | 5/2010 | Yamamoto et al. ........... 714/749 |
| 2012/0051241 A1 | 3/2012 | Mori et al. |

FOREIGN PATENT DOCUMENTS

| JP | 2005-045521 A | 2/2005 |
| JP | 2005-086692 A | 3/2005 |
| JP | 2010-245935 A | 10/2010 |
| JP | 2012-049886 A | 3/2012 |

* cited by examiner

*Primary Examiner* — Pao Sinkantarakorn
(74) *Attorney, Agent, or Firm* — Posz Law Group, PLC

(57) ABSTRACT

A first receiver receives an activation signal from a first network and gives the activation signal to an input side of a second transmitter via a first connection line; thereby, the activation signal is sent out via the second transmitter to a second network. Thus, the activation signal is not directly transmitted from the first network to the second network; instead, the activation signal is transmitted by using conversion functions of the first receiver and the second transmitter. This configuration can prevent occurrence of distortion or attenuation in the activation signal. The activation signal from the first network thus enables ECUs belonging to the second network to be activated certainly without delay.

10 Claims, 4 Drawing Sheets

DATA RELAY APPARATUS

CROSS REFERENCE TO RELATED APPLICATION

The present application is based on Japanese Patent Application No. 2013-36049 filed on Feb. 26, 2013, the disclosure of which is incorporated herein by reference.

TECHNICAL FIELD

The present disclosure relates to a data relay apparatus that is provided in between a first network and a second network to relay data communication between communication nodes in the first network and the second network.

BACKGROUND ART

[Patent Literature 1] JP 2005-86692 A

For example, Patent Literature 1 discloses a gateway apparatus that permits an in-vehicle instrument connected to a first network to activate in-vehicle instruments, which are connected to a different second network, from sleep state without delay. This gateway apparatus connects the first network and the second network to each other using a signal line having a switch; the signal line connects (i) a signal transmission route between the bus of the first network and a transceiver and (ii) a signal transmission route between the bus of the second network and a transceiver. When the gateway apparatus is in the sleep state, the switch of the signal line is closed to connect the buses of the different first and second networks via the signal line. Therefore, a wake-up signal is transmitted in the first network, the wake-up signal can be transferred to the different second network, without waiting for activation of the gateway apparatus.

In a general communication system, the increase of the number of communication nodes connected to a single network causes the increase in stray capacitance, or the reflection of signals due to impedance mismatching; this distorts or declines the waveforms of signals in the network bus, tending to cause a transmission error. Such issue eventually limits the number of communication nodes connected to a single network. If the number of communication nodes intended to be networked exceeds the limit number of a single network, a different second network is additionally prepared and connected to the first network via a gateway apparatus.

Patent Literature 1 describes the configuration of the gateway apparatus in which the different networks are mutually connected directly using a switch as if a new temporal single network is produced by connecting all the different networks. This new temporal single network apparently contains the whole of the communication nodes belonging to all the different networks. This may cause a transmission error of a wake-up signal in the new temporal single network having a great number of communication nodes to lead to the possibility that a communication node belong to a first network cannot activate certainly communication nodes belonging to a different second network.

SUMMARY

It is an object of the present disclosure to provide a data delay apparatus to relay an activation signal arising in a first network to a different second network to enable the activation signal in the first network to activate communication nodes belonging to the second network certainly without delay.

To achieve the above object, according to an example of the present disclosure, a data relay apparatus is provided in between a first network and a second network to relay data communication between communication nodes belonging to the first network and communication nodes belonging to the second network. The data relay apparatus includes a first transceiver, a second transceiver, and a control portion. The first transceiver includes a first transmitter transmitting data to the first network and a first receiver receiving data from the first network. The second transceiver includes a second transmitter transmitting data to the second network and a second receiver receiving data from the second network. The control portion is provided in between the first transceiver and the second transceiver to control a data relay process. The control portion has an operation mode including a usual mode and a sleep mode, the sleep mode stopping the data relay process to suppress electricity consumption, the usual mode enabling the data relay process. The control portion under the sleep mode is to switch into the usual mode based on reception of a predetermined activation signal from at least one of the first network or the second network. The data relay apparatus further includes a first connection line and a first switch portion. The first connection line connects an output line of the first receiver to an input line of the second transmitter. The first switch portion is inserted in the first connection line to permit electrical conduction of the first connection line when the control portion is under the sleep mode. Herein, when the control portion is under the sleep mode, an activation signal from the first network is routed to the second network via the first receiver, the first connection line, and the second transmitter.

Under the above configuration, the first receiver receives an activation signal from the first network and gives the activation signal to an input side of the second transmitter via the first connection line; thereby, the activation signal is sent out via the second transmitter to the second network. Here, the receiver is to convert a potential in a communication bus into a signal which can be dealt with by the control portion; the transmitter is to convert the signal outputted from the control portion into a potential of a communication bus. Thus, the activation signal is not directly transmitted from the first network to the second network; instead, the activation signal is transmitted upon or by using conversion functions of the first receiver and the second transmitter. This configuration can prevent occurrence of distortion or attenuation in waveforms of the activation signal. As a result, the activation signal from the first network enables communication nodes belonging to the second network to be activated certainly without delay.

The above configuration of the data relay apparatus routes an activation signal from the first network to the second network using the first receiver and the second transmitter without using the control portion. Another comparable configuration of the data relay apparatus may be desirably provided which routes an activation signal from the second network to the first network.

That is, according to an optional example, the data relay apparatus may further include a second connection line connecting an output line of the second receiver to an input line of the first transmitter, and a second switch portion inserted in the second connection line to permit electrical conduction of the second connection line when the control portion is under the sleep mode. When the control portion is under the sleep mode, an activation signal from the second network may be routed to the first network via the second receiver, the second connection line, and the first transmitter.

The above configuration permits an activation signal to be bidirectional routed from the first network to the second network and from the second network to the first network using receivers and transmitters. Such a configuration may cause an activation signal to circulate through the closed route that is formed by both the first connection line and the second connection line, to thereby be sent out to each network continuously.

To prevent such issue, according to an optional example, the data relay apparatus may further include a first shut-down instruction portion instructing the second switch portion to shut down electrical conduction of the second connection line when the activation signal from the first network is routed to the second network via the first receiver, the first connection line, and the second transmitter.

Further, similarly, according to an optional example, the data relay apparatus may further include a second shut-down instruction portion instructing the first switch portion to shut down electrical conduction of the first connection line when the activation signal from the second network is routed to the first network via the second receiver, the second connection line, and the first transmitter.

Such configuration can prevent the activation signal from circulating through the closed route formed by both the first connection line and the second connection line.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiment

Figure 1:
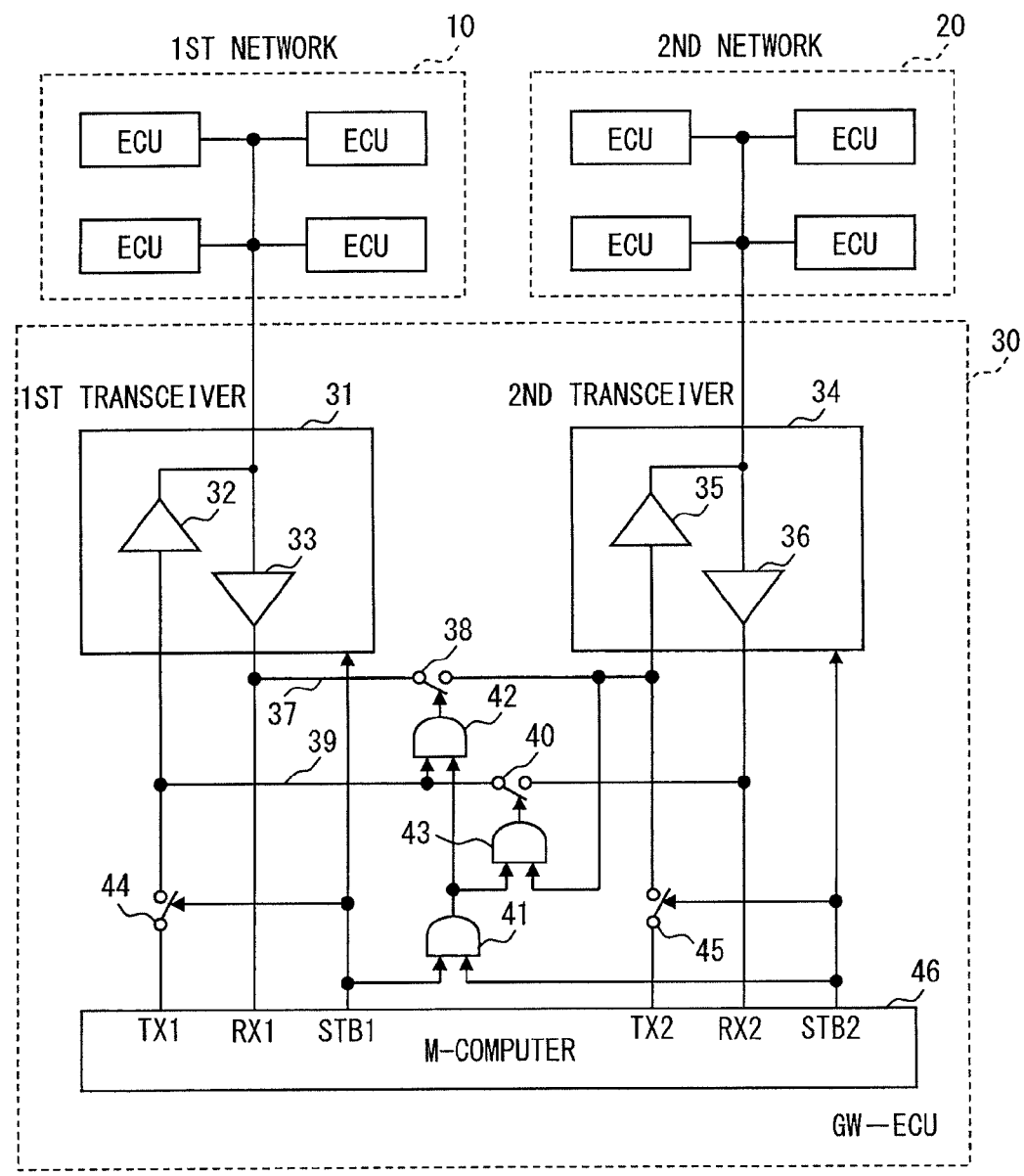
FIG. 1 is a block diagram illustrating an overall configuration of a communication system to which a data delay apparatus according to an embodiment of the present disclosure applies.

A data relay apparatus (gateway ECU) according to an embodiment of the present disclosure applies to a communication system. FIG. 1 is a block diagram illustrating an overall configuration of the communication system.

The communication system according to the present embodiment applies to various kinds of electronic control units (ECUs) which control electronically various kinds of in-vehicle instruments mounted in a vehicle, for example. Herein, the vehicle may be also referred to as a host vehicle to which the communication system is mounted. That is, the ECUs controlling various kinds of in-vehicle instruments are connected to a communication bus to belong to a network system or to be networked, thereby forming a communication system. These ECUs communicate with each other, for example, according to communications protocols, such as CAN (Controller Area Network) or LIN (Local Interconnect Network), to exchange necessary data or control in cooperation. The ECUs forming a network include ECUs for controlling power train group instruments, vehicle body group instruments, information group instruments, and safety group instruments. The power train group instruments include an engine, a transmission, and a brake. The vehicle body group instruments include an air-conditioner, a seat, and a door lock. The information group instruments include a navigation apparatus, an electronic toll collection system, and a radio. The safety group instruments include an air bag.

Many ECUs are networked to form a network communication configuration to communicate with each other. The excessive increase in the number of ECUs connected to a single network tends to cause the distortion or attenuation in signal waveforms to lead to a transmission error. Such reason eventually limits the number of communication nodes connected to a single network. To that end, in general, a plurality of networks are prepared for a great number of ECUS to form a network communication configuration; the plurality of networks are connected by gateway ECU(s) each serving as a data relay apparatus to relay communication data. With reference to FIG. 1, a network communication configuration includes a first network 10 and a second network 20; a gateway ECU 30 is provided to intervene in between the first network 10 and the second network 20.

It is noted that the various kinds of ECUs belonging to the first and second networks 10 and 20 are required recently to execute the various kinds of controls even when a host vehicle is under the vehicle stop state (e.g., travel-stop state or driving source-inactivated state). For example, the controls under the vehicle stop state include a smart door lock release (i.e., door unlock) or a pre-air conditioning.

The smart door lock release is performed as follows, for example. First, under the vehicle stop state, a verification ECU performs a wake-up operation periodically to transmit radio waves outwardly around the host vehicle for communicating with a portable terminal that is held by a user of the host vehicle. The portable terminal may transmit a response signal with an ID code in reply to the transmitted waves while the ID code may be successfully verified. In such a case, a power ECU provides electric power to enable the door lock release switch provided in a vehicle door to move to the activated state. When the user's manipulation to the door lock release switch under the activated state is detected, a door ECU drives a door lock motor to release the door lock. As explained above, the smart door lock release enables the verification ECU, the power ECU, and the door ECU to exchange data while cooperatively performing controls for the door lock release under the vehicle stop state.

In addition, the pre-air conditioning operates in cases that the portable terminal held by the user issues an execution instruction of the pre-air conditioning when the verification by the verification ECU is satisfied. When detecting the issuance of the execution instruction for the pre-air conditioning, the verification ECU instructs the air-conditioning ECU and the power ECU to execute the pre-air conditioning. Then, the power ECU provides the power to control target elements of the air-conditioner apparatus, such as a compressor, a fan, and an air mixing door. Furthermore, the air-conditioner ECU controls the drive states of the compressor, the fan, and the air mixing door to adjust the temperature of the vehicle compartment to match a preset temperature or a temperature that is set at the issuance of the execution instruction for the pre-air conditioning. This enables the vehicle compartment to be adjusted at a comfortable temperature when the user gets in. Thus, similarly, the pre-air conditioning enables the verification ECU, the power ECU, and the air-conditioner ECU to perform cooperatively controls under the vehicle stop state.

The vehicle stop state signifies that the power generation is not performed by an alternator or the regeneration brake is not performed by the motor. This situation significantly requires the power consumption by each ECU to decrease to a minimum level. Therefore, for example, the CAN protocol permits the gateway ECU 30 and the ECUs belonging to the first network 10 and the second network 20 to move to the sleep mode as follows. That is, a communication bus in a network may become a recessive level more than a predetermined time period while the communication bus continues being under a vacant state (i.e., idle state). In such a case, the ECUs belonging to the network is permitted to move to the sleep mode that stops communication functions or arithmetic processing functions of a microcomputer. In addition, similarly, the gateway ECU 30 is permitted to move to the sleep mode in a condition that all the ECUs belonging to all the networks that are connected with the gateway ECU 30 are under the sleep mode and, simultaneously, none of the communication data to relay arises.

It is noted that the CAN protocol is adopted with a 2-wire communication line serving as the communication bus, in which the two wires are connected with the termination resistors at both ends. A subject ECU, which transmits data, controls a transceiver to generate two kinds of high and low potential differences (i.e., voltage differences) between the 2-wire communication line to thereby communicate "1" and "0" in the communication bus. In this case, the CAN protocol defines the logic "0" as a dominant level generating the high potential difference in the 2-wire communication line.

It is noted that under a usual CAN protocol, when a subject ECU transmits a signal of a dominant level as an activation signal while the respective ECUs are under the sleep mode, any ECU that receives the signal of the dominant level inevitably returns (i.e., transitions) from the sleep mode to the usual mode being an operation mode permitting the communication function. For instance, suppose a case that a first ECU belonging to the first network 10 transmits an activation signal while needing communication with a second ECU belonging to the second network 20. In such a case, the activation signal is transferred to the second network 20 via the gateway ECU 30.

Transferring an activation signal from a first network to a different second network may be performed using a data relay process by a gateway ECU in a usual manner as follows. That is, a subject ECU belonging to the first network needs first to output a first activation signal for returning the gateway ECU from the sleep mode to the usual mode. Then, the subject ECU or the gateway ECU needs to transmit a second activation signal that is to be transferred to the second network. This manner needs a significant time for the activation of the ECUs belonging to the different second network. To address such an issue, another manner that is explained in "BACKGROUND ART" is proposed which provides a switch directly connecting the first network with the second network when the gateway ECU is under the sleep mode. Such configuration using the direct switch, unfortunately, increases the number of ECUs connected to the same network temporarily; this tends to produce a distortion or attenuation in waveforms of an activation signal to thereby lead to the possibility not to activate certainly ECUs that are connected to the different second network.

To that end, the present embodiment configures the gateway ECU 30 to activate the ECUs belonging to one of the first and second networks 10 and 20 without delay when an activation signal is sent out by an ECU belonging to the other one of the first and second networks 10 and 20.

The following explains the configuration of the gateway ECU 30. The gateway ECU 30 includes a microcomputer 46 as a control portion to perform a data relay process. The data relay process receives communication data from the first network 10 and transmits the received data to the second network 20 while receiving communication data from the second network 20 and transmitting the received data to the first network 10. An ECU that controls an in-vehicle instrument may include a function of the gateway ECU 30. In other word, the gateway ECU 30 may also function as an ECU belonging to either the first network 10 or the second network 20 for controlling an in-vehicle instrument. In such a case, the gateway ECU 30 may generate a data which is to be transmitted to an ECU belonging to the first network 10 and/or the second network 20, or control a relative in-vehicle instrument based on the data received from another ECU.

The microcomputer 46 includes a first data transmit port TX1 for outputting data to be transmitted to the first network 10; and a first data receive port RX1 for receiving data from the first network 10. Further, the microcomputer 46 includes a second data transmit port TX2 for outputting data to be transmitted to the second network 20; and a second data receive port RX2 for receiving data from the second network 20. Furthermore, the microcomputer 46 includes a first standby port STB1 and a second standby port STB2. The first and second standby ports STB1 and STB2 are to output a standby signal or an activation signal to a first transceiver 31 and a second transceiver 34, respectively. It is noted that the first standby port STB1 and the second standby port STB2 may be provided to be a single common port.

The microcomputer 46 outputs standby signals (Hi signals) from the first standby port STB1 and the second standby port STB2 under the sleep mode. In contrast, the microcomputer 46 outputs activation signals (Lo signals) from the first standby port STB1 and the second standby port STB2 when operating under the usual mode.

The gateway ECU 30 includes the first transceiver 31 for performing data communication with an ECU belonging to the first network 10. The first transceiver 31 includes a first transmitter 32 and a first receiver 33. The first transmitter 32 is connected to the first data transmit port TX1 of the microcomputer 46 via a third switch 44 to generate the high and low potential differences in the 2-wire communication line of the first network 10 depending on the logical level of the data outputted by the microcomputer 46. This permits transmission of a communication frame to the first network 10; the communication frame includes either the signal of "1" or the signal of "0" according to the logical level of the data to be transmitted. In addition, the first receiver 33 converts the potential difference of the 2-wire communication line in the first network 10 into the logical level which the microcomputer 46 can deal with, and outputs it to the first data receive port RX1 of the microcomputer 46.

Further, the gateway ECU 30 includes the second transceiver 34 for performing data communication with an ECU belonging to the second network 20. The second transceiver 34 includes a second transmitter 35 and a second receiver 36, like the first transceiver 31. The second transmitter 35 is connected to the second data transmit port TX2 of the microcomputer 46 via a fourth switch 45. In addition, the second receiver 36 is connected to the second data receive port RX2 of the microcomputer 46. The second transmitter 35 and the second receiver 36 have functions similar to those of the first transmitter 32 and the first receiver 33, respectively.

When the microcomputer 46 may output a standby signal to the first transceiver 31 and the second transceiver 34, (i) the power supply to the first transmitter 32 and the second transmitter 35 is stopped, or (ii) the first receiver 33 and the second receiver 36 are switched from usual receivers to low power consumption receivers if provided in the first and second receivers 33 and 36 in addition to the usual receivers. The low power consumption receiver is to perform only reception of an activation signal in low power consumption. Thereby, the sleep mode of the gateway ECU 30 reduces the electric power consumption in the first transceiver 31 and the second transceiver 34.

Further, a first connection line 37 is provided to connect (i) a signal line connecting the first data receive port RX1 to the output side of the first receiver 33 and (ii) a signal line connecting the second data transmit port TX2 to the input side of the second transmitter 35. Furthermore, a first switch 38 is inserted in the first connection line 37; the first switch 38 is to permit the conduction of the first connection line 37 or shut down the conduction of the first connection line 37.

Further, a second connection line 39 is provided to connect (i) a signal line connecting the first data transmit port TX1 to the input side of the first transmitter 32 and (ii) a signal line connecting the second data receive port RX2 to the output side of the second receiver 36. Furthermore, a second switch 40 is inserted in the second connection line 39; the second switch 39 is to permit the conduction of the second connection line 39 or shut down the conduction of the second connection line 39.

A first AND gate 41 is provided of which the input terminals are connected to the outputs from the first and second standby ports STB1 and STB2, respectively. The first AND gate 41 outputs a Hi signal when the first standby port STB1 and the second standby port STB2 commonly output the Hi signals.

A second AND gate 42 is provided such that one of two input terminals is connected to the output of the first AND gate 41 while the other one of two input terminals is connected to the second connection line 39 on one side of the second connection line 39 itself (i.e., the left side of the second switch 40 in FIG. 1). This one side of the second connection line 39 is between (i) the second switch 40 and (ii) the signal line connecting the input side of the first transmitter 32 to the first data transmit port TX1. The switching condition of the first switch 38 is switched by the output of the second AND gate 42. To be specific, when the second AND gate 42 outputs the Hi signal, the first switch 38 is switched to the closed state (ON state); when the second AND gate 42 outputs the Lo signal, the first switch 38 is switched to the opened state (OFF state).

A third AND gate 43 is provided such that one of two input terminals is connected to the output of the first AND gate 41 while the other one of two input terminals is connected to the first connection line 37 on one side of the first connection line 37 itself (i.e., the right side of the first switch 38 in FIG. 1). This one side of the first connection line 37 is between (i) the first switch 38 and (ii) the signal line connecting the input side of the second transmitter 35 to the second data transmit port TX2. The switching condition of the third switch 40 is switched by the output of the third AND gate 43. To be specific, when the third AND gate 43 outputs the Hi signal, the second switch 40 is switched to the closed state (ON state); when the third AND gate 43 outputs the Lo signal, the second switch 40 is switched to the opened state (OFF state).

The switching conditions of the third and fourth switches 44 and 45 are switched depending on the levels of the signals outputted from the first and second standby ports STB1 and STB2, respectively. To be specific, when the first and second standby ports STB1 and STB2 output activation signals (Lo signals), the third and fourth switches 44 and 45 are switched to the closed state (ON state), respectively; when the first and second standby ports STB1 and STB2 output standby signals (Hi signals), the third and fourth switches 44 and 45 are switched to the opened state (OFF state), respectively. Thus, the switching conditions of the third and fourth switches 38 and 40 are switched in the logic reverse to those of the first and second switches 38 and 40. The third and fourth switches 44 and 45 each may be also referred to as a prohibition portion.

Figure 2:
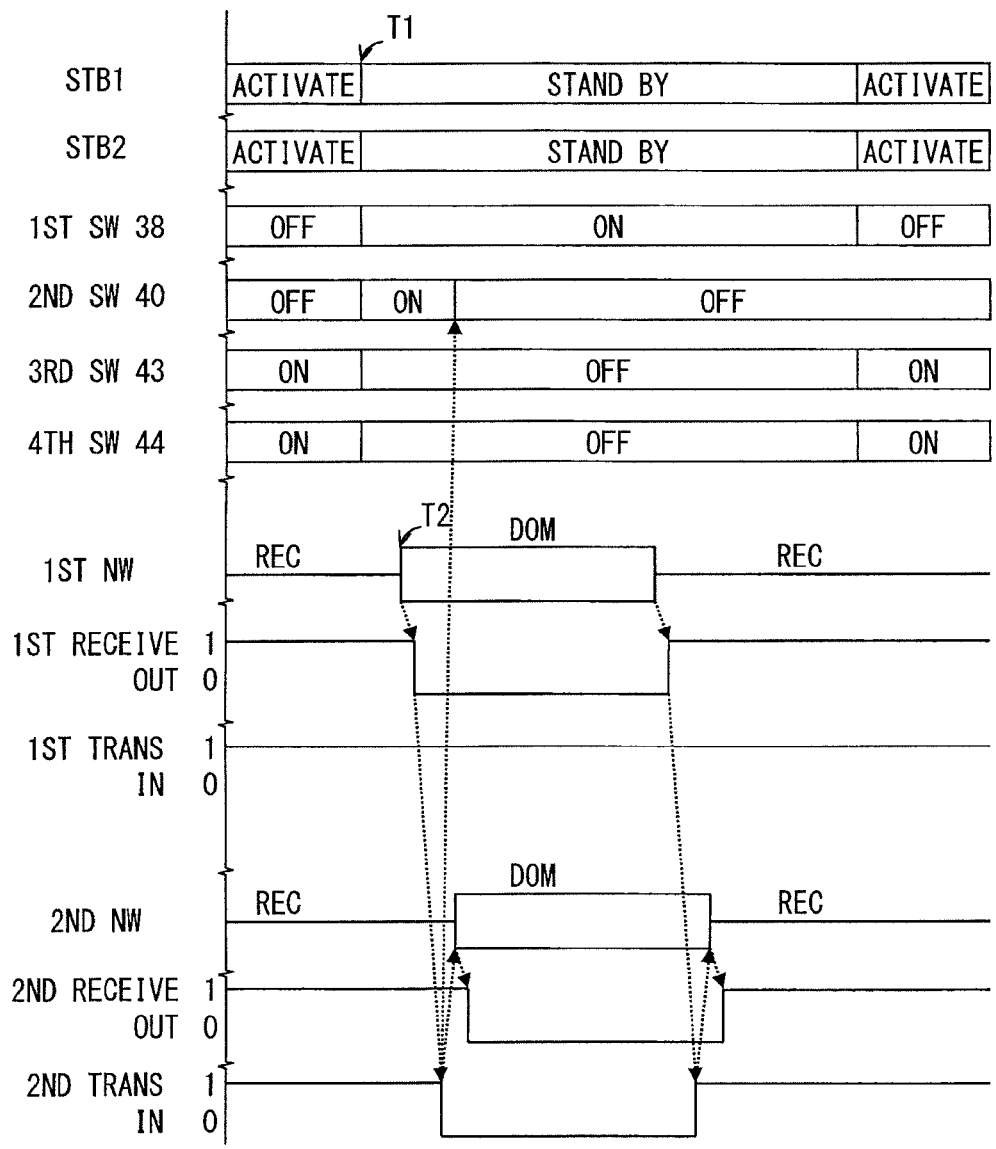
FIG. 2 is a time chart diagram for explaining an operation of the data delay apparatus.

The following will explain an operational effect obtained by the above mentioned configuration with reference to a time chart of FIG. 2.

First, the gateway ECU 30 moves to a sleep mode. Then, at T1, the first standby port STB1 and the second standby port STB2 of the microcomputer 46 output respective standby signals (Hi signals); thereby, the first AND gate 41 outputs a Hi signal. At this time (T1), the 2-wire communication lines of the first and second networks 10 and 20 are under recessive levels where no data communication is executed. (When the 2-wire communication line moves to a dominant level, the gateway ECU 30 (i.e., microcomputer 46) moves from a sleep mode to a usual mode.) When the 2-wire communication lines of the first and second networks 10 and 20 are under the recessive levels, the first and second receivers 33 and 36 output Hi signals of logic "1", respectively. Therefore, the input terminals of the second and third AND gates 42 and 43 receive respective Hi signals. Therefore, the second and third AND gates 42 and 43 output respective Hi signals; thereby, the first and second switches 38 and 40 move to respective closed states (i.e., ON state). The second and third AND gates 42 and 43 each may be also referred to as a shut-down instruction portion.

Then, at T2, an ECU belonging to the first network 10 transmits an activation signal that has the dominant level. The output of the first receiver 33 moves from the Hi signal of logic "1" to the Lo signal of logic "0". The Lo signal is inputted to the first data receive port RX1 of the microcomputer 46. Furthermore, since the first switch 38 is under the closed state (i.e., ON state), the Lo signal is also inputted or transmitted to the second transmitter 35. This input of the Lo signal of logic "0" permits the second transmitter 35 to output a signal having the dominant level to the second network 20. As the above sequence, the activation signal from the first network 10 is routed or transmitted to the second network 20 via the first receiver 33, the first connection line 37, and the second transmitter 35.

Then, the signal having the dominant level outputted by the second transmitter 35 is received by the second receiver 36; thereby, the second receiver 36 outputs a Lo signal of logic "0". Here, in case that the second receiver 36 and the first transmitter 32 are electrically connected via the second connection line 39, the following undesirable situation arises. That is, this Lo signal is given to the input of the first transmitter 32 via the second connection line 39, and the signal level of the first network 10 becomes further dominant, which the first receiver 33 then receives. This results in the situation where the dominant signal and the Lo signal circulate through an inter-transceivers closed circuit which is formed by the first and second transceivers 31 and 34 and the first and second connection lines 37 and 39 to thereby cause the dominant signal to be continuously sent out to the first and second networks 10 and 20. The sending out of the dominant signal continues until the microcomputer 46 is activated and outputs activation signals from the first standby port STB1 and the second standby port STB2.

In contrast, the present embodiment provides a different configuration as follows. That is, the Lo signal outputted by the first receiver 33 is given to not only the second transmitter 35 but also one of two input terminals of the third AND gate 43 via the first connection line 37, at the same time. This configuration switches the output of the third AND gate 43 to the Lo signal, thereby switching the second switch 40 from the closed state (ON state) to the opened state (OFF state). This permits the above-mentioned inter-transceivers closed circuit to open to thereby prevent the Lo signal outputted by the second receiver 36 from entering the input side of the first transmitter 32. That is, even when a signal of the dominant level is received from either the first network 10 or the second network 20, the dominant signal can be prevented from being continuously sent out to the first and second networks 10 and 20.

Then the microcomputer 46 returns from the sleep mode to the usual mode according to the reception of a Lo signal from the first receiver 33 via the first data receive port RX1. Thereby, activation signals are outputted from the first and second standby ports STB1 and STB2, thereby turning the first and second switches 38 and 40 into the OFF states (i.e., opened states). Therefore, while the microcomputer 46 operates in the usual mode, a signal is not routed between the first network 10 and the second network 20 via the first and second connection lines 37 and 39.

The above explained operation of the gateway ECU 30 enables an activation signal from the first network 10 to be routed to the second network 20 without need to wait for the microcomputer 46 to return to the usual mode. This enables the ECUs belonging to the second network 20 to return from the sleep mode without delay.

Furthermore, the activation signal from the first network 10 is routed or transmitted to the second network 20 via the first receiver 33 and the second transmitter 35. Thus, in the present embodiment, the activation signal is not directly transmitted from the first network 10 to the second network 20; instead, the activation signal is transmitted upon using a conversion function of the first receiver 33 and the second transmitter 35. This configuration can prevent occurrence of distortion or attenuation in the activation signal. As a result, an activation signal from the first network 10 enables the ECUs belonging to the second network 20 to be activated certainly.

Further, in the present embodiment, when the microcomputer 46 becomes in a sleep mode, the signal line which connects the microcomputer 46 and each transmitter 32 and 35 is shut down by the third and fourth switches 44 and 45. This configuration can prevent incorrect data from being outputted from the data transmit ports TX1 and TX2 of the microcomputer 46 due to a difference in power supply voltage between the microcomputer 46 and the transceivers 31 and 34. Furthermore, the third and fourth switches 44 and 45 can separate the connection lines 37 and 39 from the data transmit ports TX1 and TX2. This enables a Hi signal to enter one of two input terminals of each of the second and third AND gates 42 and 43 certainly, while enabling the first and second switches 38 and 40 to switch to the closed state certainly.

The above explanation is made for an example where an ECU belonging to the first network 10 transmits a signal of the dominant level as an activation signal with reference to FIG. 2. There is no need to be limited thereto. Even when an ECU belonging to the second network 20 transmits a signal of the dominant level, a similar operation takes place in the gateway ECU 30.

The embodiments of the present disclosure are thus described; however, without being restricted to the embodiments mentioned above, the present disclosure may be variously modified as long as not deviating from the scope thereof.

First Modification Example

The above embodiment explains an example where an activation signal of the dominant level activates all the ECUs in the sleep mode at the same time. In contrast, a partial CAN or partial networking for CAN may be used. That is, an individual activation signal is to contain a code, which specifies a subject ECU that needs to be activated; thereby, the individual activation signal is used for activating individually the subject ECU that has been under the sleep mode.

Figure 3:
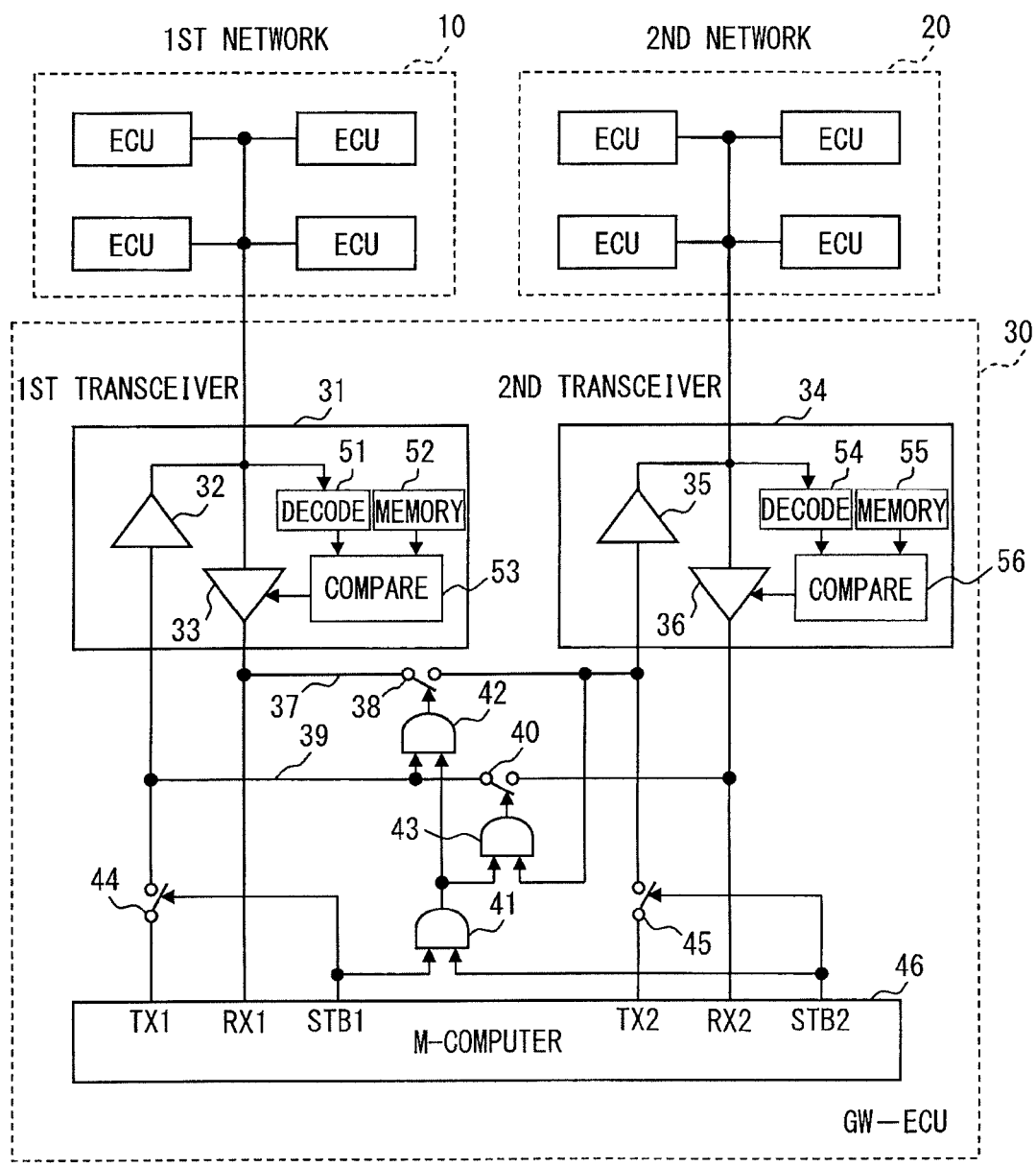
FIG. 3 is a block diagram illustrating a configuration of a communication system according to a first modification example of the embodiment.

With reference to FIG. 3, a discrimination circuit of an individual activation signal is provided in each ECU which needs to be individually activated. The following describes a discrimination circuit of an individual activation signal.

FIG. 3 illustrates an example where a discrimination circuit (also referred to as a determination portion) of an individual activation signal is provided in each of the first transceiver 31 and the second transceiver 34. The discrimination circuit of the individual activation signal includes decoders 51 and 54, memories 52 and 55, and comparison logic portions 53 and 56.

Like the first and second receivers 33 and 36, the decoders 51 and 54 have functions of decoding the potential differences of the 2-wire communication lines to the logical levels, and outputting to the comparison logic portions 53 and 56, respectively. The comparison logic portions 53 and 56 determine whether combinations (combination signals) of the logical levels decoded by the decoders 51 and 54 correspond to codes stored in the memories 52 and 55, respectively. The memory 52 provided in the first transceiver 31 stores the code corresponding to the gateway ECU 30 and the code of an ECU, which that belongs to the second network 20 while needing an individual activation. The memory 55 provided in the second transceiver 34 stores the code corresponding to the gateway ECU 30 and the code of an ECU, which belongs to the first network 10 while needing an individual activation as well. This is because the gateway ECU 30 needs to relay an activation signal to an ECU belonging to a different network.

When the comparison logic portions 53 and 56 determine that the combination signals of the logical levels correspond to the codes stored, the combination signals of the logical levels decoded by the decoders 51 and 54 are outputted to the output sides of the first and second receivers 33 and 36, respectively. To specific, the combination signal of the logical levels decoded by the decoder 51 is outputted to the output side of the first receiver 33. Then, a data signal according to the combination signal is outputted from the second transmitter 35. In contrast, the combination signal of the logical levels decoded by the decoder 54 is outputted to the output side of the second receiver 36. Then, a data signal according to the combination signal is outputted from the first transmitter 32. In addition, the combination signal also activates the microcomputer 46, which thereafter performs a usual data relay process to permit all the ECUs belonging to the first and second networks 10 and 20 to communicate with each other.

Second Modification Example

Figure 4:
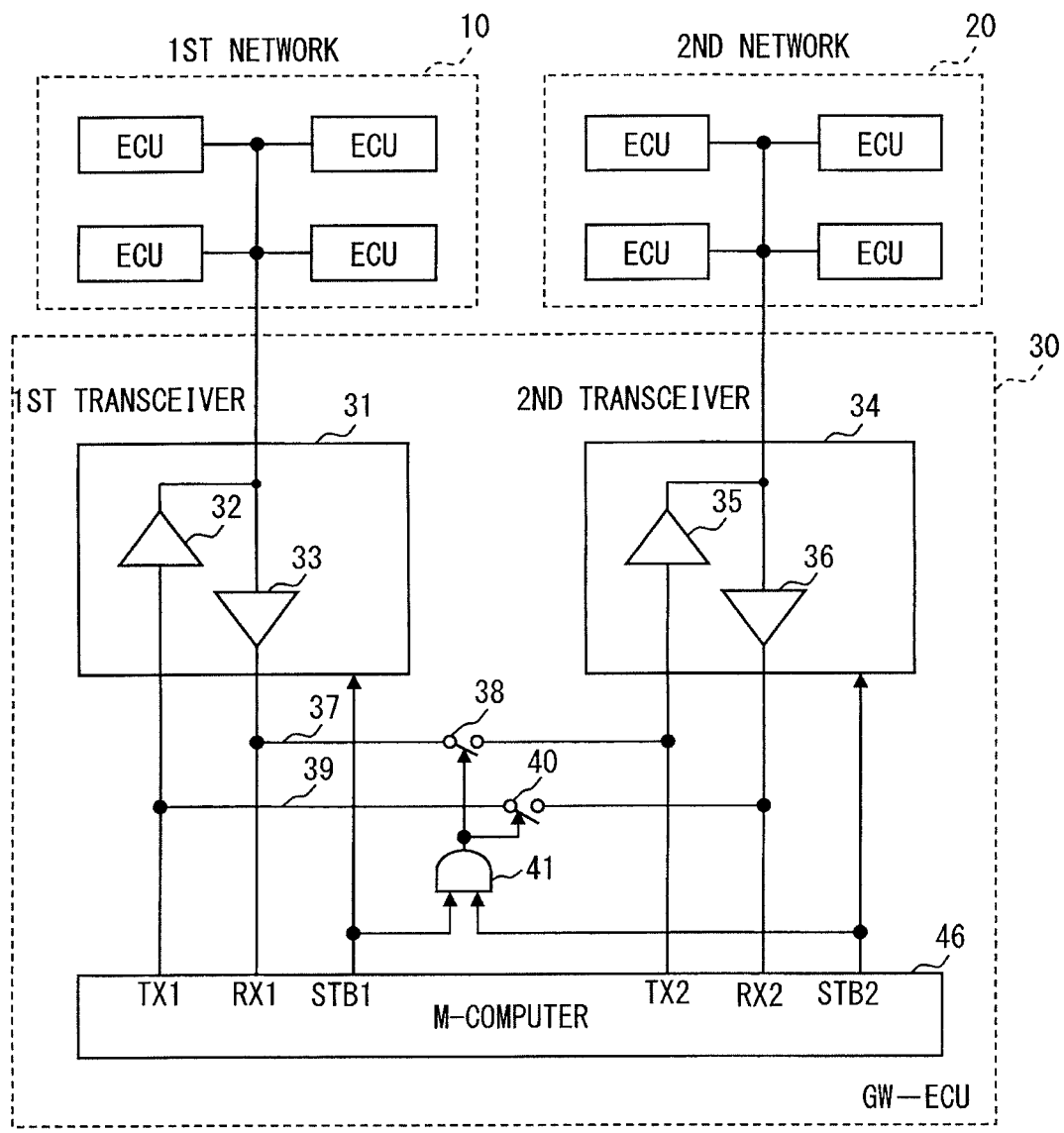
FIG. 4 is a block diagram illustrating a configuration of a communication system according to a second modification example of the embodiment.

The above embodiment explains an example where the use of the second and third AND gates 42 and 43 prevent an activation signal from circulating within a closed circuit. There is no need to be limited thereto. Even if such circulation of an activation signal (the dominant signal and the Lo signal) arises, the circulation can be finished by the microcomputer 46 when it is activated. Therefore, the second and third AND gates 42 and 43 are omitted to simplify a configuration of the gateway ECU 30, as indicated in FIG. 4.

Furthermore, a different example of a configuration may be provided in cases that an activation signal is only transmitted from an ECU belonging to the first network 10 to an ECU belonging to the second network 20 whereas any activation signal is not transmitted from an ECU belonging to the second network 20 to an ECU belonging to the first network 10. That is, in the different example, the second connection line 39 and the second switch 40 can be deleted from the configuration illustrated in FIG. 4.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A data relay apparatus provided in between a first network and a second network to relay data communication between communication nodes belonging to the first network and communication nodes belonging to the second network, the data relay apparatus comprising:
   a first transceiver including a first transmitter transmitting data to the first network and a first receiver receiving data from the first network;
   a second transceiver including a second transmitter transmitting data to the second network and a second receiver receiving data from the second network;
   a control portion provided in between the first transceiver and the second transceiver to control a data relay process,
      the control portion having an operation mode including a usual mode and a sleep mode, the sleep mode stopping the data relay process to suppress electricity consumption, the usual mode enabling the data relay process,
      the control portion under the sleep mode being to switch into the usual mode based on reception of a predetermined activation signal from at least one of the first network or the second network;
   a first connection line connecting an output line of the first receiver to an input line of the second transmitter; and
   a first switch portion inserted in the first connection line to permit electrical conduction of the first connection line when the control portion is under the sleep mode,
   wherein when the control portion is under the sleep mode, an activation signal from the first network is routed to the second network via the first receiver, the first connection line, and the second transmitter.

2. The data relay apparatus according to claim 1, further comprising:
   a second connection line connecting an output line of the second receiver to an input line of the first transmitter; and
   a second switch portion inserted in the second connection line to permit electrical conduction of the second connection line when the control portion is under the sleep mode,
   wherein when the control portion is under the sleep mode, an activation signal from the second network is routed to the first network via the second receiver, the second connection line, and the first transmitter.

3. The data relay apparatus according to claim 2, further comprising
   a first shut-down instruction portion instructing the second switch portion to shut down electrical conduction of the second connection line when the activation signal from the first network is routed to the second network via the first receiver, the first connection line, and the second transmitter.

4. The data relay apparatus according to claim 2, further comprising
   a second shut-down instruction portion instructing the first switch portion to shut down electrical conduction of the first connection line when the activation signal from the second network is routed to the first network via the second receiver, the second connection line, and the first transmitter.

5. The data relay apparatus according to claim 1, wherein after the activation signal from the first network is routed to the second network via the first receiver, the first connection line, and the second transmitter,
   the control portion
      switches from the sleep mode into the usual mode by the activation signal and
      then instructs the first shut-down instruction portion to shut down the electrical conduction of the first connection line.

6. The data relay apparatus according to claim 2, wherein after the activation signal from the second network is routed to the first network via the second receiver, the second connection line, and the first transmitter,
   the control portion
      switches from the sleep mode into the usual mode with the activation signal and
      then instructs the second shut-down instruction portion to shut down the electrical conduction of the second connection line.

7. The data relay apparatus according to claim 1, wherein:
   the activation signal includes node information, the node information specifying an activation-needed communication node that needs to be activated; and
   the first transceiver includes a first determination portion,
      the first determination portion
         determining whether the node information included in the activation signal from the first network specifies a communication node belonging to the second network as the activation-needed communication node, and
         allowing the first receiver to output the activation signal when determining that the node information specifies the communication node belonging to the second network as the activation-needed communication node.

8. The data relay apparatus according to claim 1, wherein:
   the activation signal includes node information, the node information specifying an activation-needed communication node that needs to be activated; and
   the second transceiver includes a second determination portion,
   the second determination portion
      determining whether the node information included in the activation signal from the second network specifies a communication node belonging to the first network as the activation-needed communication node, and
      allowing the second receiver to output the activation signal when determining that the node information specifies the communication node belonging to the first network as the activation-needed communication node.

9. The data relay apparatus according to claim 1, further comprising
 a first prohibition portion prohibiting a data signal from being sent out to the first network via the first transmitter when the control portion is under the sleep mode.

10. The data relay apparatus according to claim 1, further comprising
 a second prohibition portion prohibiting a data signal from being sent out to the second network via the second transmitter when the control portion is under the sleep mode.

\* \* \* \* \*